United States Patent [19]

Douglas

[11] Patent Number: 4,628,315

[45] Date of Patent: Dec. 9, 1986

[54] ADDRESSABLE TRANSDUCER WITH IMPROVED ADDRESS SIGNAL PROCESSING

[75] Inventor: Norman F. Douglas, Albuquerque, N. Mex.

[73] Assignee: Sparton Corporation, Jackson, Mich.

[21] Appl. No.: 523,693

[22] Filed: Aug. 16, 1983

[51] Int. Cl.$^4$ .................... G08C 19/16; G08C 19/04
[52] U.S. Cl. ................... 340/870.26; 340/870.02; 340/825.52
[58] Field of Search .............. 340/870.26, 825.07, 340/870.02, 870.03, 825.52, 825.6, 870.05

[56] References Cited

U.S. PATENT DOCUMENTS 4,296,413 10/1981 Milkovic .............. 340/870.26
4,486,883 12/1984 Kanai et al. ........... 340/825.07

Primary Examiner—Charles A. Ruehl
Assistant Examiner—Ted Rittmaster
Attorney, Agent, or Firm—Reising, Ethington, Barnard, Perry & Milton

[57] ABSTRACT

An addressable transducer is disclosed for use in a monitoring system of the type including a central station and multiple addressable transducers for monitoring physical conditions. The transducer is connected across a single pair of transmission lines having a voltage thereon modulated at controlled intervals to produce successive binary address signals. Each address signal is produced as a level shift, pulsewidth modulation of the line voltage. An address signal processing circuit includes a memory for storing multiple bits of an assigned address signal. A multiplexer coupled with the memory and operated under clock control derived from the transmitted address signal generates a train of pulses representing the stored address signal in bit-by-bit synchronism with the train of pulses of the transmitted address. A match detector pairs the trains of the pulses and a match counter produces a control signal in response to a match of all bits of the addresses. An electronic switch responds to the control signal and energizes a current sink oscillator in the line voltage for producing a modulating current of the transmission line having a frequency corresponding to the measured condition.

4 Claims, 7 Drawing Figures

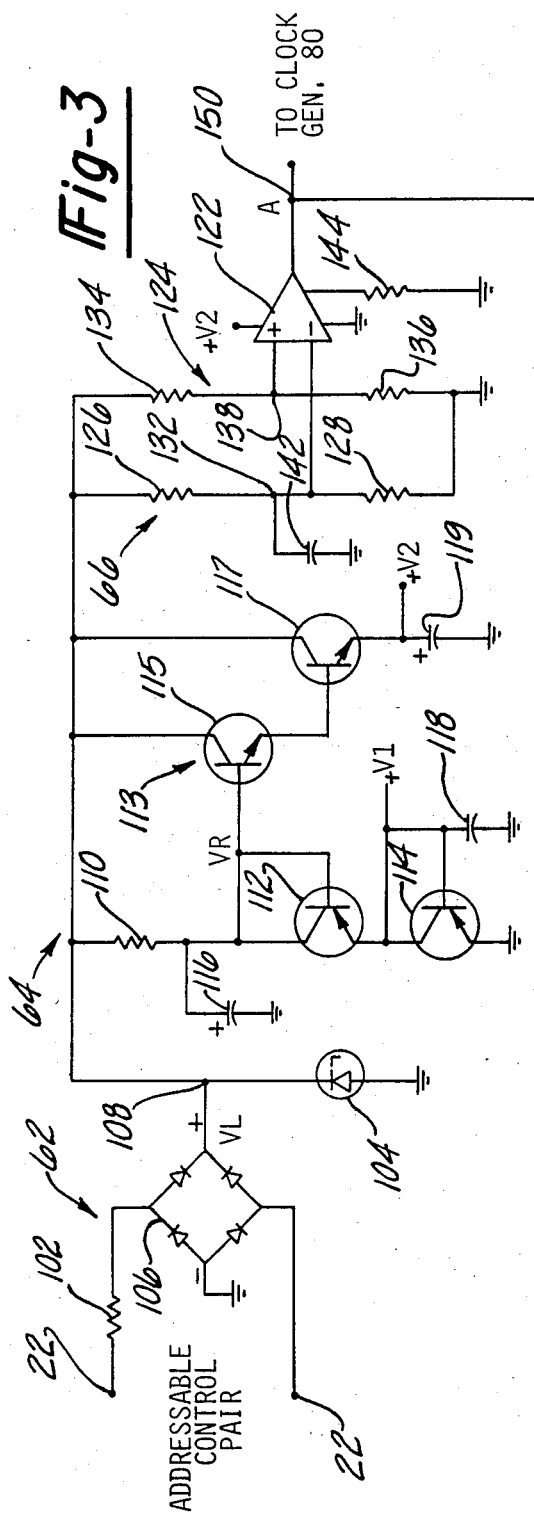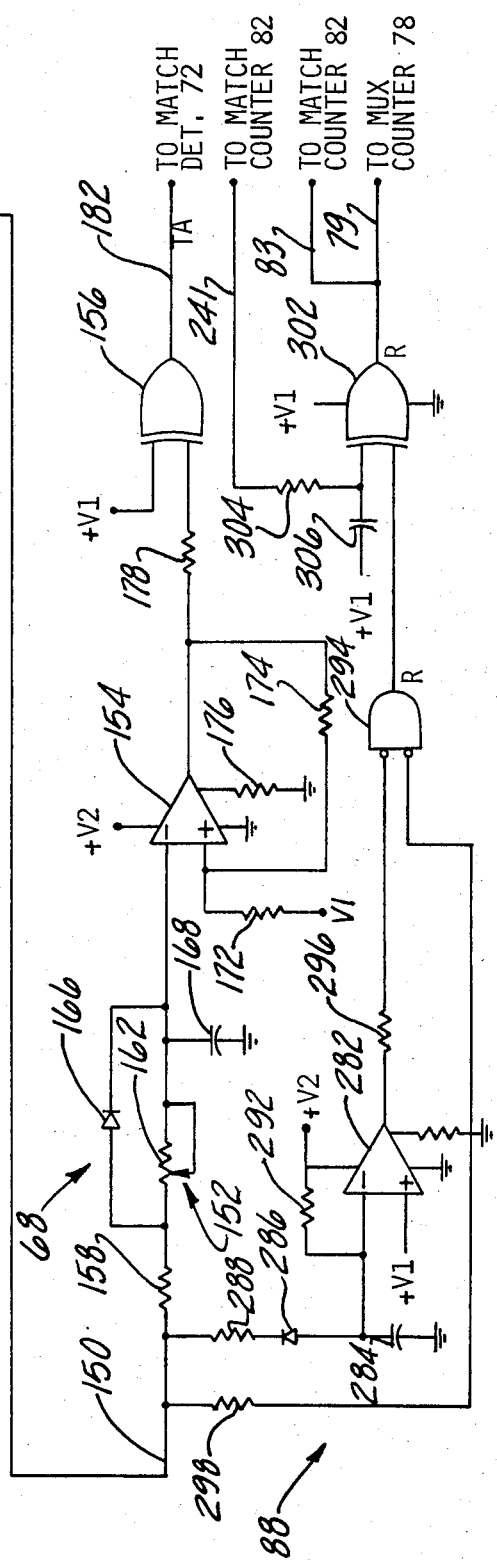
Fig-3

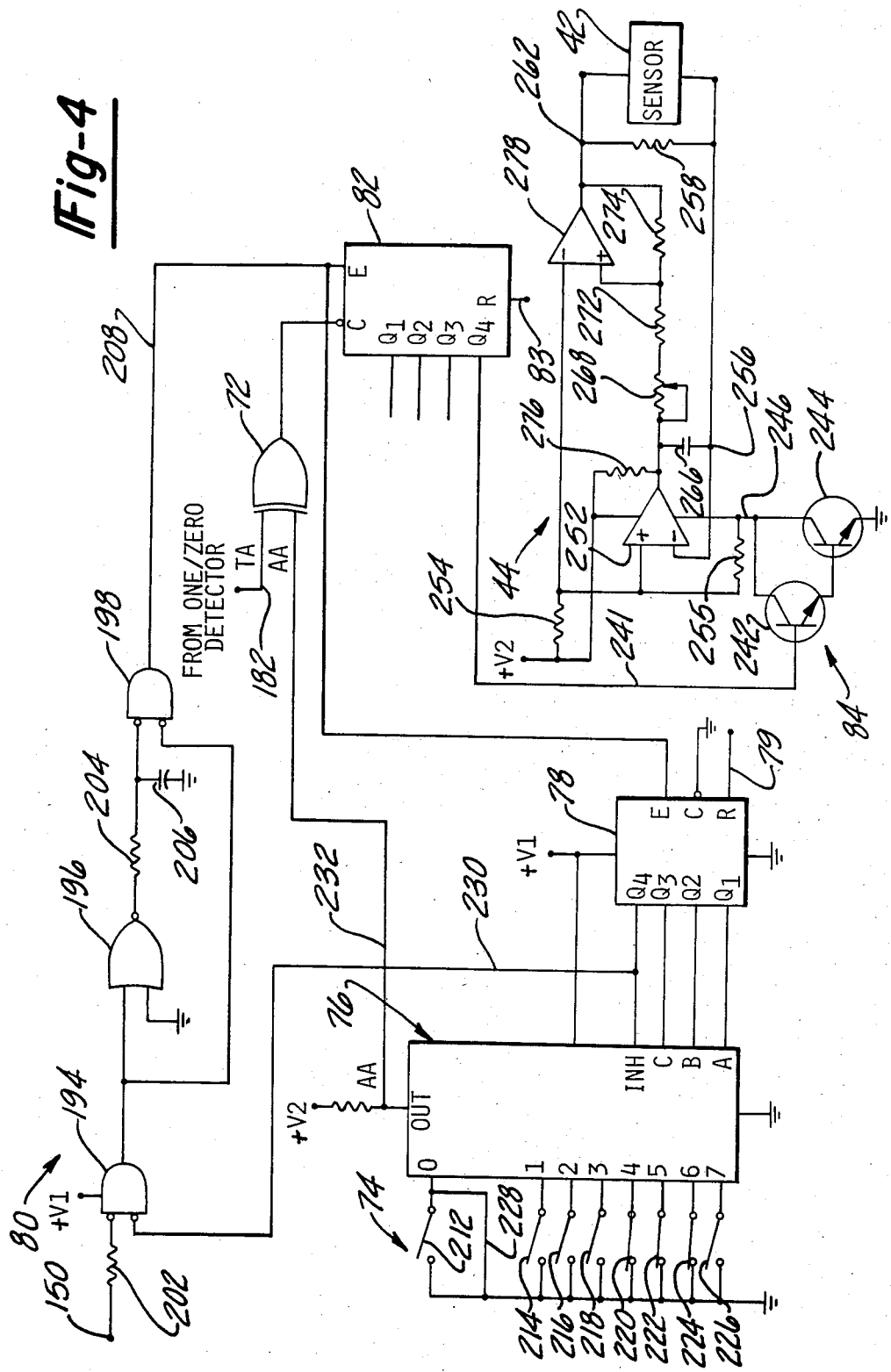

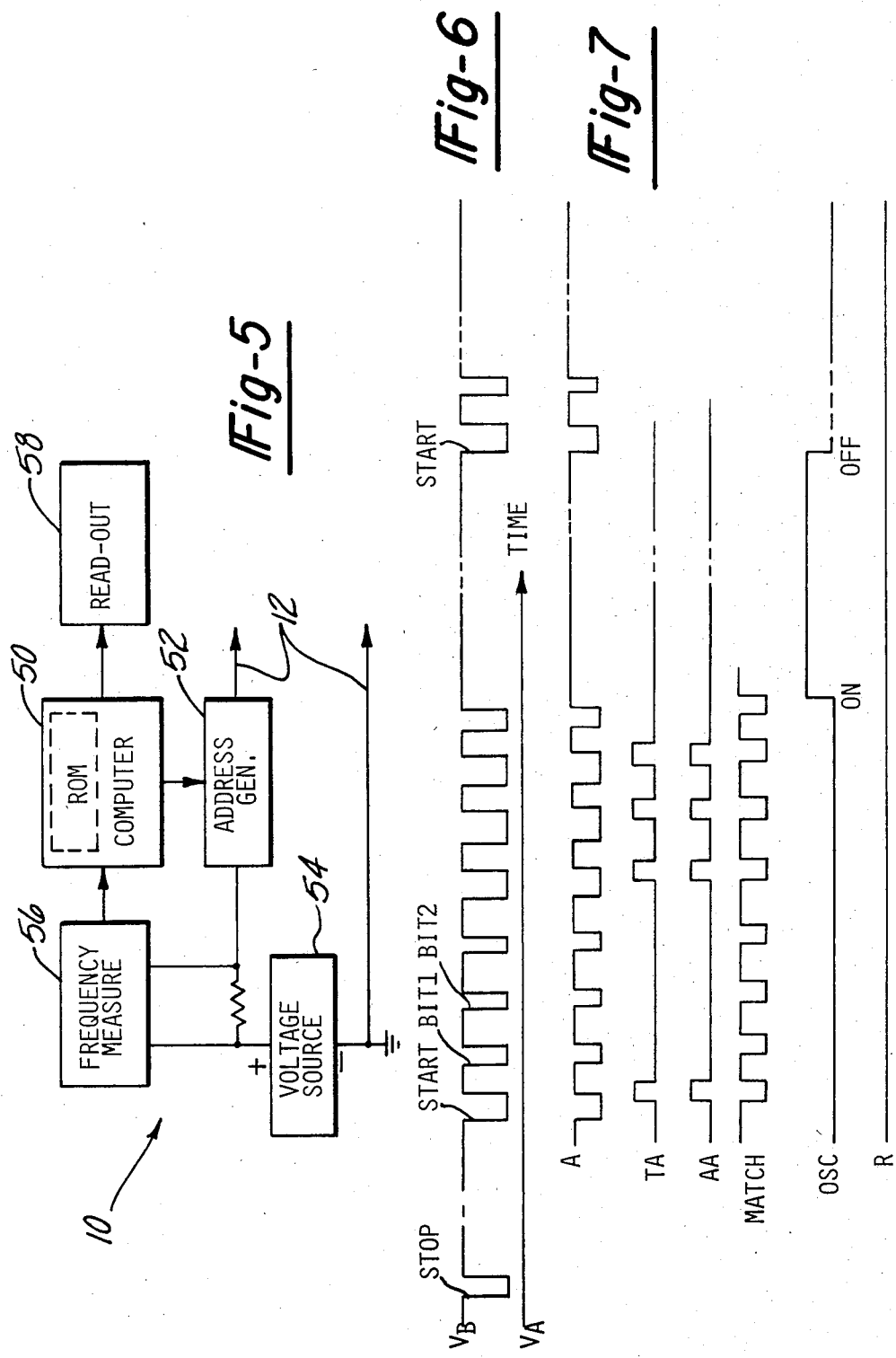

ADDRESSABLE TRANSDUCER WITH IMPROVED ADDRESS SIGNAL PROCESSING

FIELD OF THE INVENTION

This invention relates to monitoring systems for monitoring the values of physical quantities at remote locations. More particularly, it relates to a transducer which, in response to an address signal develops a signal which respresents the value of a physical quantity being monitored.

BACKGROUND ART

Monitoring systems for monitoring physical quantities or parameters are used in many applications such as manufacturing plants, chemical processing plants, pipe lines and telephone cables. The physical quantities monitored include fluid pressure, flow rate, temperature, humidity, etc. An important application is that of monitoring fluid pressure in telephone cables. This application typically requires the use of transducers at monitoring points which may be located up to one hundred miles or so from the monitoring or central station. In this kind of application, it is desired to use a large number of transducers with a minimum of transmission lines and power requirements while realizing a high degree of accuracy and reliability in the acquisition of data representing the values of the monitored physical quantities.

In the prior art, the Goldstine et al U.S. Pat. No. 3,327,289 discloses a remote monitoring system especially adapted for multiple transducers. The central station is connected through a pair of wires to multiple remote transducers each of which is selectively responsive to a tone frequency. An interrogator circuit at the central station selectively applies the tone frequencies to the pair of wires and a constant current source is continuously connected to the pair of wires. When a transducer receives the tone frequency assigned to it, a switching transistor is turned on and a variable resistor representing the physical quantity is connected across the pair of wires. Compensation is provided for the resistance of the wires and the voltage appearing on a resistor at the central station is proportional to the value of the quantity being monitored.

The Whiteside U.S. Pat. No. 4,103,337 discloses a monitoring system in which data is transmitted from a remote sensor using a form of analog to pulse width to digital conversion. A central processor transmits a data request signal on a single wire transmission line to the remote sensor. The data request signal activates the sensor and the interface electronics and also provides electrical power thereto. Upon receipt of the data request signal, the interface electronics generates a low impedance to ground signal on the transmission line after a time lapse corresponding to the value of the quantity being monitored. The low impedance to ground signal is detected by the central processor which terminates the data request signal. The central processor includes a pulse width to digital converter which produces a digital signal indicative of the time duration of the data request signal and hence the value of the quantity.

The Bogacki U.S. Pat. No. 4,202,195 discloses a meter terminal unit for an automatic meter reading system. Plural meter terminal units are connected across the power lines and each unit can be separately addressed by a control unit which sends messages in digital form by RF pulses on the power lines. A transmitter at the terminal unit receives an RF carrier signal and a binary data message. In this system, the terminal unit is addressed by RF pulse modulation and the unit sends data by a fixed frequency RF oscillator as a carrier wave which is modulated by a binary signal.

The Falck U.S. Pat. No. 3,952,285 relates to a security polling system with multiple transponders on a pair of telephone lines. Each transponder is assigned an account number for addressing purposes and a selected transponder is polled by transmitting its assigned frequency from the central station. The transponder with the transmitted account number is activated to send its status condition to the central station. In this system, each transponders requires two different fixed frequency oscillators and the status information is represented by the duration and sequency of frequency bursts from the oscillators.

The Augenblick et al U.S. Pat. No. 3,944,928 discloses a central transmitter which radiates a carrier signal having an address encoded thereon. The receiving stations have an address decoder and each station includes a rectifier for the received carrier signal to provide energization of the station. A data signal is used to modulate a harmonic of the carrier signal which is radiated by an antenna back to the central transmitter.

RELATED PATENT APPLICATION

This invention is an improvement on that disclosed and claimed in my co-pending application U.S. Ser. No. 235,349 filed Feb. 17, 1981 and entitled "ADDRESSABLE TRANSDUCER WITH A VARIABLE FREQUENCY OSCILLATOR FOR MONITORING A PHYSICAL QUANTITY" and assigned to the assignee of this application.

A general object of this invention is to provide an improved transducer for use in a monitoring system.

SUMMARY OF THE INVENTION

This invention provides an improved addressable transducer especially adapted for use in monitoring the value of physical quantities in connection with long line telephone cables and similar installations. The invention utilizes simplified circuitry with a significantly reduced component count and small size packaging relative to the circuitry of U.S. Ser. No. 235,349 cited above. Further, manufacturing costs are reduced and reliability is enhanced.

According to this invention, an improved address detector is provided for addressable transducers in a monitoring system with multiple transducers on a single pair of transmission lines extending from a central station. The pair of lines have a voltage thereon which is modulated at controlled intervals to produce successive binary address signals each including a train of pulses representing binary bits of a transmitted address for selectively addressing one of the transducers. The address detector is coupled with the pair of lines and includes memory means for storing multiple bits of an address signal assigned to the transducer. A multiplexer is coupled with the memory means for generating a train of pulses representing the binary bits of the stored address signal. A clock generator produces clock pulses corresponding to each pulse of the transmitted address. The clock pulses are applied to a counter which is coupled with the enabling inputs of the multiplexer to produce a train of pulses at the output of the multiplexer corresponding to the assigned address signal. The assigned address signal is in bit-by-bit synchronism with the train of pulses of the transmitted addresses. A match detector compares the trains of pulses bit-by-bit and means are provided for producing a control signal in response to a match of all bits of the transmitted address with all bits of the assigned address.

A more complete understanding of this invention will be obtained from the detailed description that follows taken with the accompanying drawings.

DESCRIPTION OF THE DRAWINGS

FIGS. 3 and 4 taken together constitute a schematic diagram of the addressable transducer;

FIG. 5 is a block diagram of the central station;

FIG. 6 is a waveform diagram representing an address code; and

FIG. 7 is a timing diagram for aid in explanation of the operation of the addressable transducer.

BEST MODE FOR CARRYING OUT THE INVENTION

Figure 1:
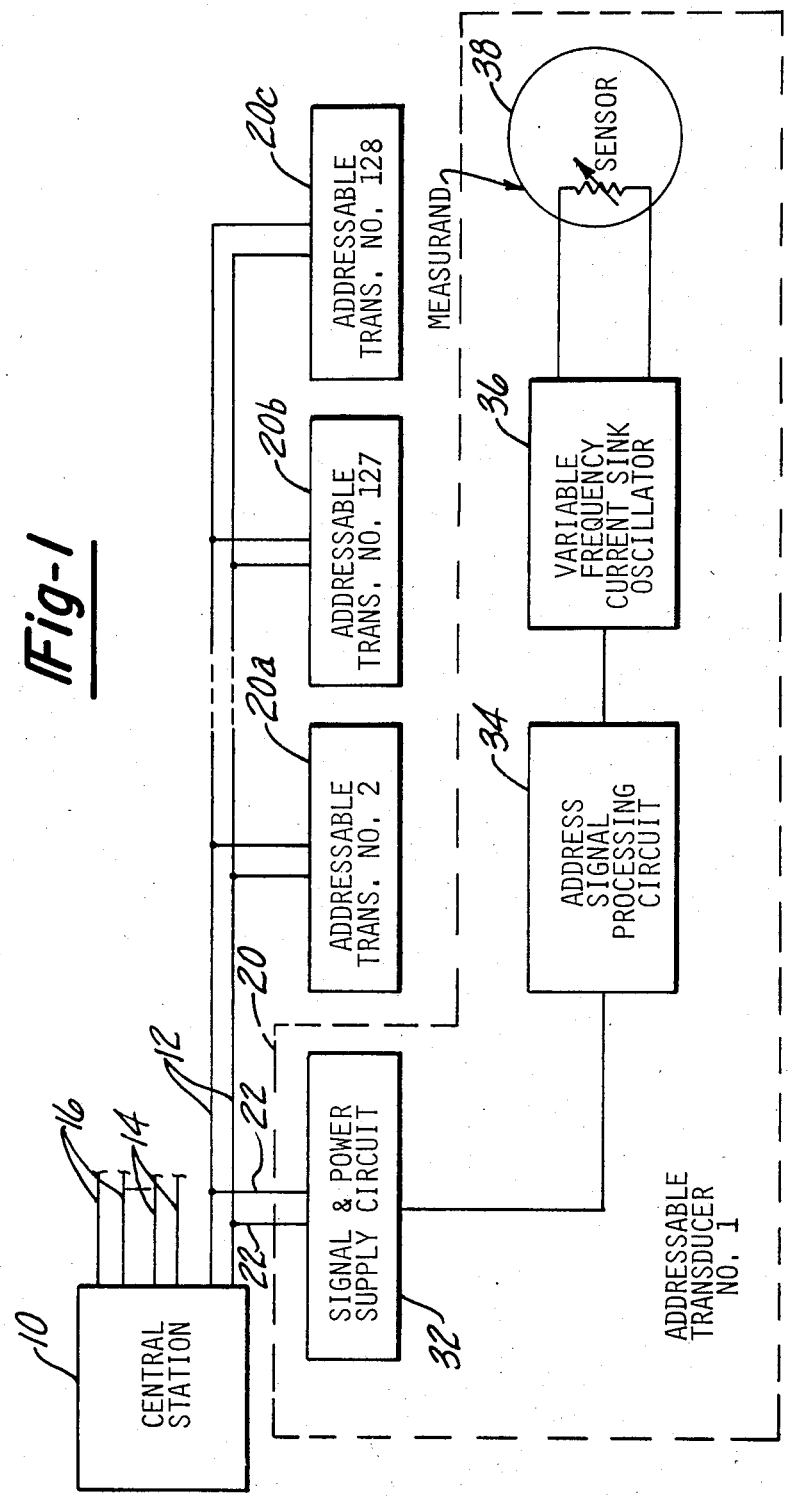
FIG. 1 is a block diagram showing addressable transducers in a monitoring system according to this invention.

Referring now to the drawings, there is shown an illustrative embodiment of the invention in an addressable transducer for use in a monitoring system which is adapted for monitoring values of physical conditions at a large number of locations some of which may be a long distance from the central station of the system. This embodiment is especially adapted for use in monitoring a telephone cable installation with multiple transducers being connected through the same pair of transmission lines to the central station. In particular, the individual transducers are selectively addressed by a pulse width modulated voltage applied to the pair of lines at the central station. The address signal is effective to interrogate that transducer having the transmitted address. The addressed transducer responds by producing current modulation in the lines at a frequency corresponding to the value of the physical condition being monitored. The frequency is measured at the central station as an indication of the value of the physical condition. It will be apparent as the description proceeds that the invention may be used in many different applications and it may be implements in different ways.

As shown in FIG. 1, the monitoring system comprises a central station 10, such as a telephone cable maintenance center which is adapted to automatically monitor physical quantities, such as fluid pressure, at spaced points along a cable. For this purpose, a transmission line pair 12, sometimes known as a control pair, extend through the cable to reach the most remote point on the cable to be monitored. As indicated, the central station may be capable of monitoring a number of cables, there being a separate transmission line pair, such as pairs 14 and 16, for each cable. The transmission line pair 12 is connected with multiple addressable transducers such as transducers 20, 20a, 20b, and 20c, which in the illustrative embodiment number up to 128 and are located at monitoring points along the cable. The transducer 20 is connected with the transmission line pair by a pair of input/output terminals 22 and, similarly, all of the transducers are connected in parallel across the line pair.

The transducer 20 comprises, in general, a signal and power supply circuit 32, an address signal processing circuit 34 and a variable frequency current sink oscillator 36. When a transmitted address signal is the same as the assigned address, the oscillator 36 is turned on and oscillates at a frequency determined by a sensor 38 responsive to the value of the physical quantity being monitored. The oscillator 36 produces current modulation of the line current in the transmission line pair 12. The frequency of the current modulation is measured at the central station.

The central station 10 is depicted in further detail in FIG. 5. It comprises a computer 50 for providing programmed control of the interrogation of multiple transducers and the processing of the answers received from the transducers in the form of variable frequency data signals. For this purpose, the computer 50 controls an address generator 52 which is coupled with the transmission line pair 12. The transmission line pair is powered by a DC voltage source 54. The address generator 52 modulates the line voltage with level shift, pulse width modulation to produce a serial binary address code. The computer stores a different address code for each addressable transducer and applies the addresses in sequence to the address generator 52 for sequential interrogation of the transducers. When a given transducer receives its address signal, it responds by producing a data signal on the transmission line pair in the form of a current modulation at a frequency corresponding to the value of the measured physical quantity or measurand. A frequency measuring circuit 56 is coupled to the transmission line pair and supplies a signal corresponding to the measured frequency to the computer 50. The frequency of the data signal has a predetermined relation with the value of the measured quantity and the computer is operative to translate the frequency value to the value of the quantity. This is accomplished by use of look-up tables stored in a read only memory (ROM) in the computer. The computer compares the value of the measured frequency with the values in the look-up table and produces an output corresponding to the value of the measured quantity. This is supplied to a readout 58 which displays the value measured by the responding transducer. The computer then causes generation of the address of the next transducer to be interrogated.

Before proceeding with the description of the circuitry, it will be helpful to consider the character of the voltage applied to the transmission line pair by the central station. A typical address code which is modulated on the line voltage is shown in FIG. 6. In the quiescent state, i.e. the absence of signal activity on the transmission line pair, the line voltage has a positive DC, steady state value. The value of this steady state voltage VB at the input of a given transducer is dependent upon the location of the transducer on the line pair. For a transducer close to the central station, the line voltage may be about 50 volts whereas a transducer at the remote end of a long-line may be as low as 28 volts, depending upon the current drawn through the line. The central station transmits a stop bit, which is a binary zero, followed by a quiescent interval of 3 seconds and then an address code or signal. The transducer addresses are applied to the line pair by level shift pulse width modulation of the supply voltage. Each address code is an eight bit binary serial pulse train, as shown in FIG. 6. A zero bit is represented by a 50 millisecond pulse width and a one bit is represented by a 100 millisecond pulse width. Each address code includes a lead or start bit which is a binary one for all address signals. The remaining seven bits of the address code are either ones or zeros according to the assigned code. In the example, shown in FIG. 6, the address code including the start bit, is 1 0 0 0 1 1 1 0. Typically, the address transmission rate is about three bits per second. It is noted that the last bit of the address code, bit number seven, is followed by a period in which no address code is modulated on the line voltage; during this period, however, an answer or data signal produced by the transducer does modulate the line current, as will be described below. In normal operation, after the data signal has been received by the central station, the computer initiates the transmission of the next address signal to interrogate another transducer.

Figure 2:
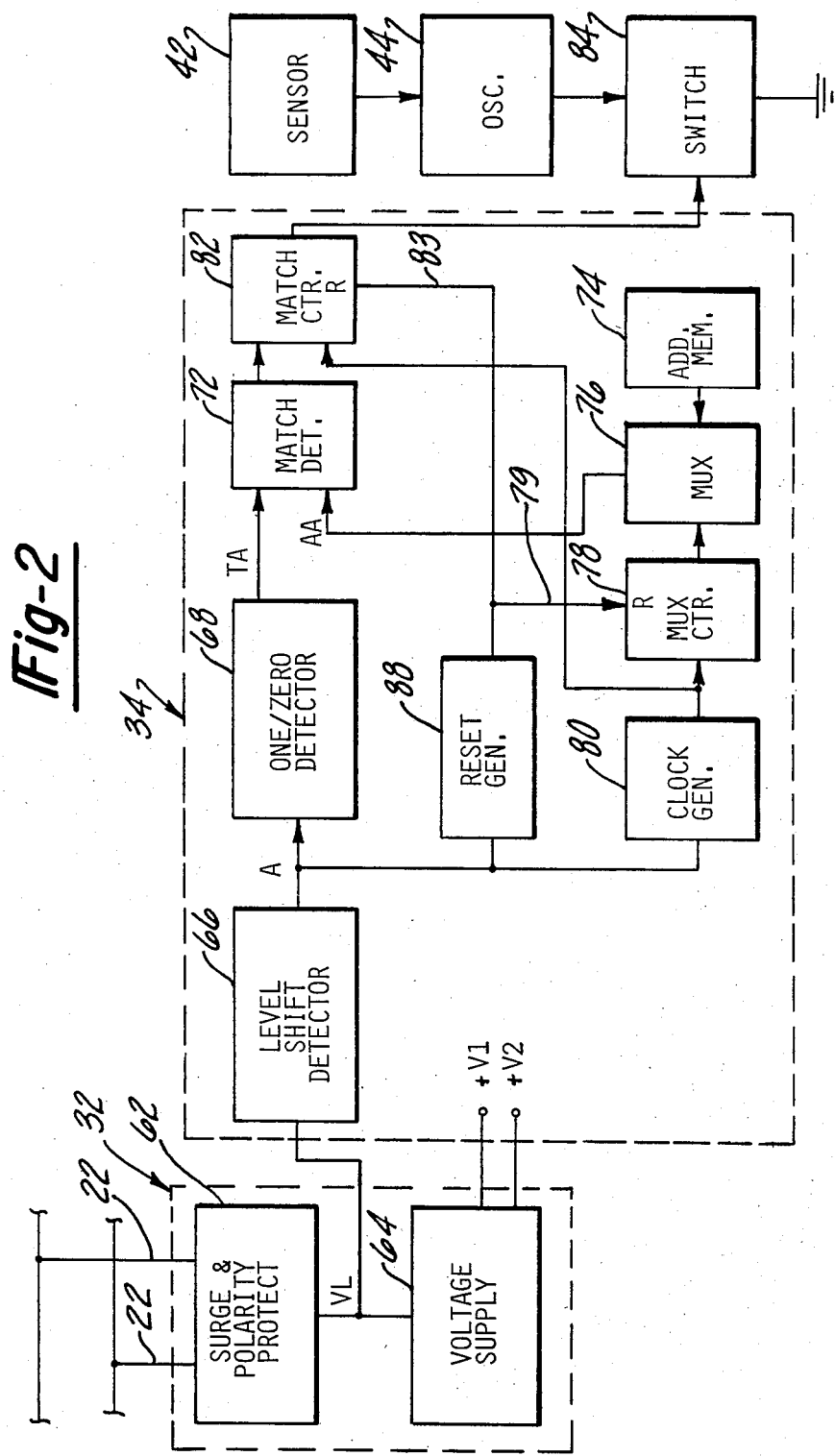
FIG. 2 is a block diagram of the addressable transducer of this invention.

The addressable transducer of this invention is shown in block diagram in FIG. 2. The signal and power supply circuit 32 comprises a surge and polarity protection circuit 62 having input terminals connected across the line pair 12. It also comprises a voltage supply circuit 64 which develops the required voltages for the different circuits of the transducer.

The address signal processing circuit 34 comprises a level shift detector 66 which detects the level shift pulsewidth modulated address signal transmitted on the line voltage VL. The output of the level shift detector 66 is applied to the data input of a one/zero detector 68. The one/zero detector 68 responds to the pulse width modulated line voltage and develops a stream of pulses representing the binary bits of the transmitted address TA. The transmitted address signal from the one/zero detector 68 is applied to one input of a match detector 72. The assigned address of the transducer 20 is stored in an address memory 74. The memory 74 is coupled with the data input of a multiplexer 76 which has its enabling inputs coupled with a multiplex counter 78. A clock generator 82 is coupled with the output of a level shift detector 66 and produces a clock pulse corresponding to each address pulse in the line voltage. The clock pulses from the clock generator 82 are applied to the multiplex counter 78 which enables successive inputs of the multiplexer 76. Accordingly, an assigned address signal AA is read out of the multiplexer 76 as a train of pulses representing the binary bits of the assigned address signal in the address memory 74. The binary bits of the assigned address signal are thus supplied in bit-by-bit synchronism with the train of pulses of the transmitted address to the other input of the match detector 72. The output of the match detector 72 is applied to a match counter 82 which counts the occurrences of matching input pulses to the match detector. If all of the bits of the address signal (including the start bit) match, the match counter 82 applies a logic signal to an electronic switch 84 in the voltage supply circuit of the oscillator 44. This completes the supply voltage circuit and starts the oscillator which modulates the current in the transmission line pair 12 at a frequency determined by the sensor 42. A reset generator 88 receives an input from the level shift detector 66 and its output is coupled with the multiplex counter 78 and the match counter 82. The reset signal from the generator 88 operates to turn off the oscillator 42 in a manner to be described subsequently.

The transducer circuits will now be described in greater detail with reference to the schematic diagrams of FIGS. 3 ad 4. The input/output terminals 22 of the addressable transducer 20, as mentioned above, are connected with the transmission line pair 12. The surge and polarity protection circuit 62 is connected across the terminals 22 and is adapted to protect the remaining circuits of the transducer from surges and from inadvertant connection of the transducer with reverse polarity. For this purpose, it comprises a series resistor 102 which limits surge currents and in case of sustained over voltage it acts as a fuse. For reverse polarity protection, a bridge rectifier 106 is connected across the lines. The line voltage VL is developed at the positive terminal 108 of the rectifier, the negative terminal being connected to ground. A zener diode 104 limits the voltage on the control pair to about 75 volts peak to protect the circuits. The line voltage VL is applied across the voltage 64 through a series resistor 110 of large ohmic value to a pair of voltage regulating devices 112 and 114. Each of the regulating devices 112 and 114 is a PNP transistor connected in the manner of a zener diode. The devices 112 and 114 are connected in series with each other between the resistor 110 and ground. Regulating device 112 develops a reference voltage VR of approximately 14.8 volts across a capacitor 116 at the collector-base junction of transistor 112. Regulating device 114 develops a regulated voltage V1 of 7.4 volts across a capacitor 118. The voltage V1 is the supply voltage for the digital CMOS circuits. The line voltage VL which is developed at terminal 108 is applied across a voltage supply circuit 113 which supplies a voltage V2 to the linear circuits including the answer oscillator 40. The supply circuit 113 includes a pair of NPN transistors 115 and 117 having their collectors connected with the terminal 108 which supplies the line voltage VL. The base of transistor 115 is connected to the collector of transistor 112 which supplies the reference voltage VR. The emitter of transistor 115 is connected to the base of transistor 117 and the emitter of transistor 117 is connected through a capacitor 119 to ground. The voltage V2 is developed across the capacitor 119.

The line voltage VL which is developed at terminal 108 is applied as the input signal to the level shift detector 66 which will be described with reference to FIG. 3. The level shift detector 66 comprises an operational amplifier (op amp) 122 and a voltage divider network 124. The level shift detector 66 is adapted to respond to the level shift of the address signal pulses on the line voltage VL and produce an output signal of enhanced pulse shape corresponding with the address pulses and having a value of approximately 14 volts for quiescent periods and zero volts during bit periods. The voltage divider network 124 comprises a pair of divider resistors 126 and 128 connected in series between the terminal 108 and ground. A node 132 between the resistors 126 and 128 is connected with the inverting input of the op amp 122. Another pair of divider resistors 134 and 136 is serially connected between the terminal 108 and ground. A node 138 between these resistors is connected with the non-inverting input of the op amp 122. The resistors 126 and 134 suitably have the same ohmic value but the resistor 136 is larger than resistor 128. A capacitor 142 is connected in parallel with the resistor 128. A resistor 144 sets the supply current to a desired value for the op amp 122 which is a current programmable device. The output of the op amp 122 develops a transmitted address signal A on the conductor 150 of the level shift detector. This signal is applied to the inputs of the one/zero detector 68, the reset generator 88 and the clock generator 82.

The level shift detector 66 operates as follows. The input voltage VL, as alluded to above, may have a steady state or unmodulated value in the range of 28–50 volts. The level shift reduces the voltage to about 0.42 of its steady state value. In operation, the voltage at the node 138 follows the level shift in a linear manner whereas the voltage at node 132 follows it in a non-linear manner due to capacitor 142. Before the receipt of the start pulse, the line voltage VL will be in a steady state condition long enough for the capacitor 142 to be charged and because of the difference in voltage division by the resistors 128 and 136, the node 138 will be more positive than node 132 and the output of the op amp 122 will be at logic high. At the occurrence of the leading edge of the start pulse, the voltage at node 138 will decrease with it in a linear manner whereas the voltage at node 132 will decrease more slowly due to the time constant of the circuit. As a result, the output of the op amp 122 goes to logic low. When the trailing edge of the start pulse occurs, the voltage at node 138 increases with it whereas the voltage at node 132 increases more slowly and the output of the op amp goes from logic low to logic high. The output voltage A is a stream of binary pulses or bits representing the transmitted address signal.

The one/zero detector 68 receives the address signal A from the level shift detector 66 and converts it from a pulse width modulated signal to a pulse signal comprised of one bits and zero bits. As described above, in the pulse width modulated address signal A, a pulse width of 50 milliseconds represents a zero bit and a pulse width of 100 milliseconds represents a one bit. The one/zero detector 68, as shown in FIG. 3, comprises, in general, a time constant circuit 152 through which the transmitted address signal A is applied to an op amp 154 which develops a binary address signal. The output of the op amp 154 is applied through an inverter 156 to the match detector 72. The time constant circuit 152 comprises a pair of series resistors 158 and 162 connected between the terminal 150 and the inverting input of the op amp 154. A diode 166 is connected in parallel with the resistor 162 and a capacitor 168 is connected between the inverting input of the op amp and ground. The non-inverting input of the op amp 154 is connected through a resistor 172 to the source of supply voltage V1. A feedback resistor 174 is connected between the output of the op amp 154 and the non-inverting input. The supply current required by the op amp is set by a resistor 176. The output of the op amp 154 is applied through a resistor 178 to one input of an exclusive NOR gate 156 which has its other input connected with the source of supply voltage V1 so that the gate functions as a simple inverter. The output of the gate 156 as stated above is connected to the input of the match detector 72.

In operation of the one/zero detector 68, the conductor 150 is at 14 volts in the quiescent condition, i.e. in the absence of the address bit pulse. In this condition, the capacitor 168 is charged to 14 volts through the resistors 158 and the diode 166. The non-inverting input of the op amp 154 is held at a lower voltage due to the voltage division by the resistors 172 and 174. Accordingly, in this condition the output of the op amp 154 is at logic low. When the output of the level shift detector 66 makes a bit transition from 14 volts to zero volts upon the occurrence of a bit pulse, the capacitor 168 discharges exponentially through resistors 162 and 158. The values of these resistors is such that the voltage at the inverting input of the op amp 154 decreases to a value less than the voltage on the non-inverting input in a period of 75 milliseconds after the bit transition occurs. Accordingly, if the bit transition is a zero bit, which has a duration of 50 milliseconds, the output of the op amp 154 will remain at logic low. On the other hand, if the bit transition is a one bit, which has a duration of 100 milliseconds, the voltage at the non-inverting input will be greater than that at the inverting input after 75 milliseconds and the output of the op amp 154 will go to logic high. The output of the op amp 154 remains at logic high until approximately 50 milliseconds after the end of the 100 millisecond period of the one bit. In this manner, the one/zero detector generates a pulse signal comprising a stream of pulses in which the transmitted address signal is comprised of a logic high for a one bit and a logic low pulse for a zero bit. The output of the op amp 154 is inverted by the gate 156 which produces an address signal TA on the conductor 182 in which a logic one is represented by a zero voltage and a logic zero is represented by 14 volts. This address signal is applied to one input of the match detector 72.

In order to determine whether a transmitted address is the same as the address assigned to the transducer 20, the assigned address is generated in synchronism with the receipt of the transmitted address. For this purpose, the assigned address is stored in the address memory 74 and it is read out through the multiplexer 76 under the control of the multiplex counter 78 and the clock generator 80. The clock generator 80 is adapted to produce a train of clock pulses which correspond with the pulses in the address signal A developed by the level shift detector 66. The clock generator 80 as shown in FIG. 4, has its input connected through conductor 150 with the output of the level shift detector 66. The clock generator 80 comprises, in general, a NAND gate 194, a NOR gate 196 and a NAND gate 198. The output of the level shift detector 66 is applied through the series resistor 202 to a first input of the NAND gate 194. The second input of the NAND gate 194 is connected to an output of the multiplex counter 78. The output of the NAND gate 194 is applied to one input of the NOR gate 196, the other input of which is connected to ground. The output of the NOR gate 196 is connected through a resistor 204 to a first input of the NAND gate 198. A capacitor 206 is connected between the first input of NAND gate 198 and ground. The second input of the NAND gate 198 is connected with the output of the NAND gate 194.

The clock generator 80 operates in the following manner. In the quiescent state, the conductor 150 is at 14 volts DC. Accordingly, the first input of the NAND gate 194 is at logic high. The second input of the logic gate 194 is at logic low and the output of the gate is at logic low. Accordingly, the output of the NOR gate 196 is at logic high. In this quiescent state, the capacitor 206 is charged and the first input of the NAND gate 198 is at logic high. The second input of gate 198 is at logic low and hence the output of the clock circuit at output terminal 208 is at logic low. When a bit transition occurs in the transmitted address signal, the voltage on conductor 150 goes to zero volts. Accordingly, the first and second inputs of the NAND gate 194 are at logic low and the output is at logic high. This causes the output of the NOR gate 196 to go to logic low and the output of the NAND gate 198 remains at logic low. At the end of the bit transition, the conductor 150 goes to 14 volts and the output of the NAND gate 194 goes to logic low. This causes the output of the NOR gate 196 to go to logic high and the capacitor 206 is charged through the resistor 204 so that the first input of the NAND gate 198 does not reach a logic high state until about 1 to 2 milliseconds after the second input of the NAND gate 198 goes to logic low. Thus, the output of the NAND gate 198 is at logic high during the 1 to 2 millisecond delay and then goes to logic low. Accordingly, the output of the clock generator 80 on conductor 208 is a 1 to 2 millisecond clock pulse which is coincident with the trailing edge of each one bit transition pulse. As will be described subsequently, the clock pulses are used to advance the multiplex counter 78 and the match counter 82.

The multiplexer 76, as previously described, generates the assigned address of the transducer 20 in serial bit fashion and in bit-to-bit synchronism with the transmitted address signal. The multiplexer 76, as shown in FIG. 4, has its data inputs zero through seven connected with the address memory 74. The enabling inputs A, B and C and the inhibit input INH are connected with the multiplexer counter 78. The data output of the multiplexer is connected to the match detector 72.

The address assigned to the transducer 20 is stored in the address memory 74. The address memory comprises a set of eight selector switches 212, 214, 216, 218, 220, 222, 224 and 226. The fixed contacts of all of the selector switches are connected to ground and the movable contacts are connected respectively with the inputs zero through seven of the multiplexer 76. The binary code of the assigned address is stored in the memory 74 by setting the selector switches. A closed switch applies a logic low voltage to its corresponding input and represents a one bit whereas an open switch supplies a logic high voltage to the input and represents a zero bit. The swtich 212 corresponds to the start bit of the address signal. As described above, the start bit for all address signals is a one bit. Accordingly, selector switch 212 is shorted to ground by the shunt connector 228. The remaining seven selector switches 214 through 226 are set in accordance with the particular address assigned to the transducer to supply either a one bit or a zero bit.

The multiplexer counter 78 is a four bit binary counter and is coupled with the multiplexer 76 to enable in sequence the address selection switches. For this purpose, the enable input E of the counter 78 is connected with the conductor 208 of the clock generator 80 and receives a clock pulse input corresponding to each bit of the transmitted address. The outputs Q1, Q2, Q3 and Q4 of the counter 78 are connected respectively with the enable inputs A, B and C and the inhibit input INH of the multiplexer 76. The clock input C of the counter 78 is connected to ground and thus the output of the counter is incremented in response to each clock pulse at the enable input E. The reset input R of the counter 78 is connected through a conductor 79 with the reset generator 88 which will be described subsequently.

The operation of the multiplexer 76 is as follows. Upon receipt of a transmitted address signal, the clock generator 80, as described above, produces a clock pulse at its output corresponding to each bit of the address signal. The successive bits, derived from the start bit and seven address bits, are applied to the enable input of the multiplexer counter 78 and the outputs Q1, Q2, Q3 and Q4 register the pulse count in binary code. The count signal from the outputs of the counter is applied to the enable inputs A, B and C and the inhibit input of the multiplexer 76. Accordingly, the data inputs zero through seven of the multiplexer are enabled in sequence and in synchronism with the clock pulse count. Accordingly, the assigned address bits from the memory 74 are applied sequentially to the output of the multiplexer 76. When the multiplexer counter 78 has received the eighth clock pulse, which indicates the end of the transmitted address signal, the output Q4 goes to logic high. This logic high is applied to the inhibit input of the multiplexer 76 to inhibit further output of the multiplexer. The output Q4 is also connected through a conductor 230 to the second input of the NAND gate 194 of the clock generator 80. This inhibits further clock pulses from being generated by extraneous transient voltages on the transmission line pair. Accordingly, the assigned address signal AA is generated in serial bit fashion as a binary pulse train in which a logic high is a zero bit and a logic low is a one bit. This assigned address signal is applied through a conductor 232 to the match detector 72 which will now be described.

The match detector 72 is an exclusive OR gate. It has a first input connected with the output of the one/zero detector 68 through conductor 182 and hence receives the pulse train representing the transmitted address TA. The exclusive OR gate has a second input which is connected through conductor 232 with the output of the multiplexer 76. Hence, this second input receives the pulse train representing the assigned address AA. The match detector 72 makes a bit-by-bit comparison of the corresponding pulses of the transmitted address signal and the asigned address signal in synchronization with the clock pulses. If the coincident bits are the same, the output of the detector goes from logic high to logic low. If the coincident bits are different, the output remains at logic high. The output of the match detector 72 is applied to the input of the match counter 82 which will now be described.

The match counter 82 is a four bit binary counter and is used to count the number of matched bits in the transmitted address signal TA and the assigned signal AA, as indicated by the match detector 72. The match counter 82 has its clock input C connected with the output of the match counter 72. It has its enable input E connected with the output of the clock generator 82. When a clock pulse, which is logic high, at the enable input coincides with a logic low at the clock input (which indicates matched bits at the detector 72), the binary count output is incremented. The counter 82 has binary count outputs Q1, Q2, Q3 and Q4. The outputs Q1, Q2 and Q3 are not connected; Q4 which goes high at the count of eight is connected through a conductor 241 to the input of the electronic switch 84. Accordingly, when the start pulse and the seven address pulses of the transmitted address signal are the same as the corresponding pulses of the assigned address signal, the match counter 82 signifies that the particular transducer 20 is being addressed by the central station. Such indication is given by a logic high on the output Q4 of the match counter 82. The match counter has a reset input R connected by a conductor 83 to the reset generator 88.

As discussed previously, the output of the match counter 82 is applied as a control signal to the electronic switch 84 of the oscillator 44. The electronic switch 84 is connected in the voltage supply circuit of the oscillator, i.e. it is connected between the oscillator and ground. As shown in FIG. 4, the oscillator 44 receives its power supply from the positive terminal of supply voltage V2 with a return circuit-to-ground through the electronic switch 84. The electronic switch includes a pair of transistors 242 and 244 connected in a Darlington circuit with the collectors connected to a ground return conductor 246 of the oscillator. The emitter of transistor 244 is connected to ground. The base of transistor 242 is connected to the output Q4 of the match counter 82. When the output Q4 is at logic low, the electronic switch 84 is open and the voltage supply circuit for the oscillator 44 is open. When the output Q4 is at logic high, the Darlington transistors 242 and 244 are turned on and the supply voltage circuit for the oscillator 44 is completed.

The oscillator 44 will now be described with reference to FIG. 4. As discussed above, the oscillator 44 is a variable frequency, current sink oscillator which is adapted to provide current modulation on the transmission line pair 12. The oscillator comprises an op amp 252 having its supply voltage input connected with the supply voltage V2 and having its ground return connected to conductor 246 which, as noted above, is connected through the electronic switch 84 to ground. The non-inverting input of the op amp 252 is connected through a resistor 254 with the positive terminal of the supply voltage V2 and is connected through a resistor 255 to the conductor 246. The inverting input of the op amp 252 is connected at a node 256 with a frequency determining network. The frequency determining network includes the sensor 42 which is connected in parallel with a resistor 258 between a node 262 and a node 256. A capacitor 266, an adjustable resistor 268, and fixed resistors 272 and 274 are connected in series between the nodes 256 and 262. The output of the op amp 252 is connected to the junction of the capacitor 266 and the resistor 268. A resistor 276 is connected between the output of the op amp 252 and the positive terminal of the supply voltage V2. The oscillator also includes an op amp 278. The non-inverting input of the op amp 278 is connected to the junction of resistors 272 and 274. The inverting input of the op amp 278 is connected to the non-inverting input of the op amp 252. The output of the op amp 278 is connectd to the node 262. The op amp 252 functions in the manner of an integrater and the op amp 278 functions in the manner of a Schmidt trigger providing feedback to the op amp 252. The op amp 252 produces a triangular output wave form and the current drawn through the resistor 276 from the transmission line pair 12 is modulated at a frequency proportional to the pressure sensed by the sensor 42. The oscillator 44 continues to oscillate until the match counter 82 receives a reset pulse on its reset input from the reset generator 88 which will now be described.

The reset generator 88, as shown in FIG. 3, takes the form of a re-triggerable one-shot multivibrator which is adapted to go from logic low to logic high in a first predetermined time interval after receiving a logic low input and the output remains high for a second predetermined time interval. The reset generator 88 comprises an op amp 282 which has its inverting input connected with the output of the level shift detector 66 through a time constant network and the conductor 150. The time constant network includes a capacitor 284 having one terminal connected to ground and its other terminal connected through a diode 286 and a resistor 288 to the conductor 150. The network also includes a resistor 292 connected between the inverting input of the op amp 282 and the supply voltage V2. The junction of the capacitor 284 and the resistor 292 is connected with the inverting input of the op amp 282. The resistor 292 is in the charging circuit of the capacitor 284 and has an ohmic value which is many times greater than the ohmic value of resistor 288 which is connected in the discharging circuit of the capacitor. The reset generator 88 also includes a negative input NAND gate 294. This NAND gate has its first inverting input connected with the output of the op amp 282 through a series resistor 296. The second inverting input of the NAND gate 294 is connected to the output 164 of the level shift detector 66 through a resistor 298. The output of the NAND gate 294 is applied to the first input of an exclusive OR gate 302. The other input of the exclusive OR gate derived from the output Q4 of the match counter 82. For this purpose, the output Q4 is connected through a resistor 304 to the second input of the exclusive OR gate 302 and a capacitor 306 which is connected with the supply voltage V1. The output of the exclusive OR gate 302 is connected to the reset input of the match counter 82 and the reset input of the multiplex counter 78.

The operation of the reset generator is as follows. When an address signal is transmitted, the output of the level shift detector 66 goes to zero volts or logic low at the leading edge of the start bit and the address bits and also at the leading edge of a stop bit. This discharges the capacitor 284 through the diode 286 and the resistor 288. Approximately 6 milliseconds after the transition at the output of the level shift detector, the voltage at the inverting input of the op amp 282 becomes less than that at the non-inverting input and the output voltage of the op amp 282 goes to logic high. When the output of the level shift detector 66 goes to logic high at the trailing edge of the bit, the capacitor 284 is charged through resistor 292 towards the supply voltage V2. If another bit is not detected within about 500 milliseconds after this transition, the voltage across the capacitor 284 will increase to a value more positive than that of V1 on the non-inverting input of the op amp 282 thus causing the output thereof to go to logic low. If another bit is detected in less than about 500 milliseconds after the previous bit, the output of the op amp 282 remains at logic high. The two input NAND gate 294 receives the output of the op amp 282 on its first input and it receives the output of the level shift detector 66 on its second input. When both inputs are at logic low, which obtains for about 6 milliseconds following the leading edge of a start bit, the output of the gate is at a logic high. Thus, a reset pulse R of about 6 milliseconds duration is produced at the output of the NAND gate 294 in response to a start bit. The succeeding address bits of the address signal occur successively in less than 500 milliseconds and accordingly the output of the op amp 282 remains at logic high for a period of about 500 milliseconds after the trailing edge of the last bit in the address signal. Accordingly, receipt of an address signal causes the NAND gate 294 to produce a reset signal only in response to the start bit. Also, in the same manner, receipt of a stop bit causes the NAND gate 294 to produce a reset signal. In either case, a reset pulse is applied through the exclusive OR gate 302 to the reset inputs of the match counter 82 and the multiplex counter 78. Thus, the counters are reset and the address signal processing circuit 34 is placed in readiness for receipt of the next address. In the event that the oscillator 44 has been turned on and has not been reset by a pulse generated by the NAND gate 294 a timed reset signal is provided at the second input of the exclusive OR gate 302. This is obtained as follows. When the output Q4 of the match counter goes to logic high, the oscillator 44 is turned on as previously described. At the same time, the logic high at output Q4 is applied through the resistor 304 to the capacitor 306. This causes the capacitor to charge and reach a logic high in 6 seconds after the oscillator is turned on. The logic high at the output of the exclusive OR gate 302 is applied to the reset inputs of the match counter 82 and the multiplex counter 78.

The operation of the addressable transducer in the monitoring system will be summarized with particular reference to the timing diagram of FIG. 7. In normal operation of the monitoring system, the base station 10 under the control of the computer 50 will successively interrogate the transducers connected with the transmission line pair 12. This is initiated by transmitting the address signal of one of the transducers, for example, transducer 20. The address signal is produced at the central station by the address generator 52 which generates the address signal by level shift, pulsewidth modulation of the line voltage VL. The modulated line voltage is applied through the signal and power supply circuit 32 to the address signal processing circuit 34. In this circuit, the level shift detector 66 produces an address signal A in the form of a level shift pulsewidth modulated signal. The start pulse is effective through the reset generator 88 to produce a reset pulse which resets the match counter 82 and the multiplex counter 78. The address signal A is applied to the one/zero detector 68 which produces a transmitted address signal TA as a binary pulse signal which is applied to the match detector 72. The address signal from the level shift detector is also applied to the clock generator 80 which generates a clock pulse corresponding with each bit of the address signal. Clock signal is applied to the match counter and the multiplex counter. The multiplexer 76 produces the assigned address signal AA in serial bit form which is applied to the match detector in bit-by-bit synchronism with the transmitted address signal. The match counter 82 counts the matched bits of the address signals and when the eighth count is reached, the electronic switch 84 is turned on. This energizes the oscillator 44 which produces current modulation of the line current in the transmission line pair 12 at the frequency of the oscillator. The oscillator frequency, which constitutes the data signal, is determined by the sensor 38 in accordance with the value of the physical quantity being monitored. The frequency of the current modulation is measured at the central station 10 and processed by the computer to produce a readout of the value of the monitored quantity.

Immediately after the data signal is received at the central station, the address signal of the next transducer to be interrogated is applied to the address generator 52. This address signal is received by the transducer 20 and the start pulse thereof will cause reset pulse to be applied to the multiplex counter 78 and the match counter 82. Accordingly, the output of the match counter 82 will go to logic low and the electronic switch 84 will turn off the oscillator 44. The address being received will not be the same as the assigned address of the transducer 20 and accordingly the output of the match counter 82 will remain low and the oscillator 44 will not be turned on.

Although the description of this invention has been given with reference to a particular embodiment, it is not to be construed in the limiting sense. Many variations and modifications will now occur to those skilled in the art. For a definition of the invention reference is made to the appended claims.

What is claimed is:

1. An addressable transducer for use in a monitoring system of the type including a central station and multiple addressable transducers for monitoring the values of selected physical conditions at multiple locations with one of said transducers at each of said multiple locations, said system being characterized by a single pair of transmission lines extending from the central station to all of said multiple locations and having a voltage thereon which is modulated at controlled intervals to produce successive binary address signals each including a train of pulses representing the binary bits of a transmitted address signal for selectively addressing one of the multiple transducers to obtain a data signal therefrom, said transducer comprising:

a current sink oscillator having a frequency determining circuit for determining the oscillator frequency and being adapted to oscillate in response to application of an operating voltage, a sensor including a condition responsive impedance element coupled with said frequency determining circuit and adapted to modify said oscillation frequency according to variations in value of said physical condition, an address signal processing circuit coupled with said pair of lines and including memory means for storing multiple bits of a stored address signal assigned to the transducer, generating means including a clocking means responsive to the pulses of said transmitted address signal for generating a train of pulses representing the binary bits of said stored address signal in bit-by-bit synchronism with the train of pulses of said transmitted address signal, a match detector for comparing said trains of pulses bit-by-bit, and a match counter for producing a control signal in response to a match of all bits of the transmitted address signal with all bits of the stored address signal, and switching means responsive to said control signal for operatively coupling said oscillator to said pair of lines for deriving an operating voltage therefrom, whereby said oscillator draws current from said pair of lines, said current having an undulating amplitude at the frequency of the oscillator whereby the frequency of the undulating current in said lines at said central station corresponds to the value of said physical condition.

2. The invention as defined in claim 1 wherein the train of pulses of the transmitted address signal is pulse width modulated, and said address signal processing circuit includes a one/zero detector coupled with said pair of lines for converting the pulse width modulated address signal to a binary pulse signal representing the transmitted address signal.

3. The invention as defined in claim 2 wherein, said generating means is a multiplexer including data inputs coupled with said memory means, enabling inputs, and an output coupled with said match detector, a clock generator for producing a clock pulse corresponding to each pulse of said pulse width modulated binary address signal, and a multiplex counter coupled with said clock generator and having an output coupled with the enabling inputs of said multiplexer, whereby said multiplexer produces said train of pulses representing the binary bits of said assigned address signal in bit-by-bit synchronism with the transmitted address signal.

4. The invention as defined in claim 3 including, a reset generator including a one shot multivibrator and a logic gate for producing a reset pulse for resetting the match counter and the multiplex counter after receipt of an address signal.

* * * * *